US012760694B2

(12) United States Patent
Barlam

(10) Patent No.: US 12,760,694 B2
(45) Date of Patent: Oct. 13, 2026

(54) LATCHES FOR NACELLE INNER STRUCTURE SECTIONS

(71) Applicant: Rohr, Inc., Chula Vista, CA (US)

(72) Inventor: Theodore Barlam, Poway, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/810,140

(22) Filed: Aug. 20, 2024

(65) Prior Publication Data

US 2026/0055742 A1 Feb. 26, 2026

(51) Int. Cl.
*F02K 1/72* (2006.01)
*B64D 29/06* (2006.01)

(52) U.S. Cl.
CPC ................ *F02K 1/72* (2013.01); *B64D 29/06* (2013.01); *F05D 2220/323* (2013.01)

(58) Field of Classification Search
CPC ............ B64D 29/06; B64D 29/08; F02K 1/72
See application file for complete search history.

(56) References Cited

U.S. PATENT DOCUMENTS

| | | | | |
|---|---|---|---|---|
| 3,541,794 | A * | 11/1970 | Bollenbacher | F02K 3/06 239/265.29 |
| 9,885,253 | B2 * | 2/2018 | Soria | B64D 29/06 |
| 11,427,341 | B2 | 8/2022 | Pretty | |
| 11,511,874 | B2 | 11/2022 | Pretty | |
| 11,624,339 | B2 | 4/2023 | Heau | |
| 2014/0361119 | A1 * | 12/2014 | Badescu | B64D 27/40 244/54 |
| 2017/0030296 | A1 * | 2/2017 | Dong | F02K 1/72 |
| 2020/0300011 | A1 * | 9/2020 | Micallef | E05C 19/145 |
| 2021/0094697 | A1 * | 4/2021 | Pretty | F01D 25/24 |
| 2021/0316872 | A1 * | 10/2021 | Lacko | B64D 29/08 |
| 2022/0084493 | A1 * | 3/2022 | Bifulco | F01D 9/02 |
| 2024/0217667 | A1 * | 7/2024 | Gonidec | F02K 1/827 |

* cited by examiner

*Primary Examiner* — Andrew H Nguyen
(74) *Attorney, Agent, or Firm* — Getz Balich LLC

(57) ABSTRACT

An aircraft propulsion system assembly includes a stationary structure, a nacelle inner structure and a nacelle outer structure. The nacelle inner structure extends circumferentially about an axis and includes a first inner structure section, a second inner structure section and a plurality of inner structure latches. The first inner structure section is disposed to a first side of the stationary structure. The second inner structure section is disposed to a second side of the stationary structure. The second inner structure section is attached to the first inner structure section by the plurality of inner structure latches. The nacelle outer structure extends circumferentially about the nacelle inner structure and includes a first outer structure section and a second outer structure section. The first outer structure section is pivotally coupled to the stationary structure. The second outer structure section is pivotally coupled to the stationary structure.

19 Claims, 7 Drawing Sheets

LATCHES FOR NACELLE INNER STRUCTURE SECTIONS

BACKGROUND

1. Technical Field

This disclosure relates generally to an aircraft propulsion system and, more particularly, to a thrust reverser for an aircraft propulsion system.

2. Background Information

An aircraft propulsion system may include a thrust reverser to aid in aircraft landing. Various types and configurations of thrust reversers are known in the art. While these known thrust reversers have various benefits, there is still room in the art for improvement.

SUMMARY OF THE DISCLOSURE

According to an aspect of the present disclosure, an assembly is provided for an aircraft propulsion system. This assembly includes a stationary structure, a nacelle inner structure, a nacelle outer structure and a bifurcation. The nacelle inner structure extends circumferentially about an axis. The nacelle inner structure includes a first inner structure section, a second inner structure section and a plurality of inner structure latches. The first inner structure section is disposed to a first side of the stationary structure. The second inner structure section is disposed to a second side of the stationary structure. The second inner structure section is attached to the first inner structure section by the plurality of inner structure latches. The nacelle outer structure extends circumferentially about the nacelle inner structure. The nacelle outer structure includes a first outer structure section and a second outer structure section. The first outer structure section is disposed to the first side of the stationary structure and is pivotally coupled to the stationary structure. The second outer structure section is disposed to the second side of the stationary structure and is pivotally coupled to the stationary structure. The bifurcation includes a first bifurcation section and a second bifurcation section. The first bifurcation section projects radially out from and structurally ties the first inner structure section to the first outer structure section. The second bifurcation section projects radially out from and structurally ties the second inner structure section to the second outer structure section.

According to another aspect of the present disclosure, another assembly is provided for an aircraft propulsion system. This assembly includes a stationary structure, a first pivotable structure, a second pivotable structure and a flowpath. The first pivotable structure is disposed to a first side of the stationary structure and is pivotally coupled to the stationary structure. The first pivotable structure includes a first outer structure section, a first inner structure section and a first bifurcation section extending radially between the first outer structure section and the first inner structure section. The first inner structure section extends circumferentially about an axis to a first end of the first inner structure section. The second pivotable structure is disposed to a second side of the stationary structure and is pivotally coupled to the stationary structure. The second pivotable structure includes a second outer structure section, a second inner structure section and a second bifurcation section extending radially between the second outer structure section and the second inner structure section. The second inner structure section extends circumferentially about the axis to a second end of the second inner structure section. The second end of the second inner structure section is attached to the first end of the first inner structure section by one or more inner structure latches. The flowpath extends circumferentially uninterrupted about an axis at least three-hundred and thirty degrees from the first bifurcation section to the second bifurcation section.

According to still another aspect of the present disclosure, another assembly is provided for an aircraft propulsion system. This assembly includes a bifurcation, a nacelle inner structure, a nacelle outer structure and a flowpath. The bifurcation includes a first bifurcation section and a second bifurcation section. The nacelle inner structure includes a first inner structure section, a second inner structure section and one or more inner structure latches. The first inner structure section is fixed to the first bifurcation section. The first inner structure section projects out from the first bifurcation section circumferentially about an axis to a first end of the first inner structure section. The second inner structure section is fixed to the second bifurcation section. The second inner structure section projects out from the second bifurcation section circumferentially about the axis to a second end of the second inner structure section. The second end of the second inner structure section is attached to the first end of the first inner structure section by the inner structure latches. The nacelle outer structure includes a first outer structure section, a second outer structure section and one or more outer structure latches. The first outer structure section is fixed to the first bifurcation section. The first outer structure section projects out from the first bifurcation section circumferentially about the axis to a first end of the first outer structure section. The second outer structure section is fixed to the second bifurcation section. The second outer structure section projects out from the second bifurcation section circumferentially about the axis to a second end of the second outer structure section. The second end of the second outer structure section is attached to the first end of the first outer structure section by the outer structure latches. The flowpath extends circumferentially uninterrupted about the axis from the first bifurcation section to the second bifurcation section.

The first pivotable structure may be configured with a first blocker door assembly. The first blocker door assembly may be configured to move from a stowed arrangement to a deployed arrangement to redirect air from the flowpath radially outward to a first thrust reverser passage. In addition or alternatively, the second pivotable structure may be configured with a second blocker door assembly. The second blocker door assembly may be configured to move from a stowed arrangement to a deployed arrangement to redirect air from the flowpath radially outward to a second thrust reverser passage.

The first outer structure section may extend circumferentially about the axis to a first end of the first outer structure section. The second outer structure section may extend circumferentially about the axis to a second end of the second outer structure section. The second end of the second outer structure section may be attached to the first end of the first outer structure section by one or more outer structure latches.

The bifurcation may be circumferentially aligned with the stationary structure about the axis.

The first bifurcation section may partially axially and radially cover the first side of the stationary structure. The second bifurcation section may partially axially and radially cover the second side of the stationary structure.

A flowpath may be formed by and may extend: radially between the nacelle inner structure and the nacelle outer structure; and/or circumferentially about an axis at least three-hundred and thirty degrees between the first bifurcation section and the second bifurcation section.

The nacelle outer structure axially may overlap one or more of the inner structure latches along the axis.

The nacelle outer structure may not axially overlap at least one of the inner structure latches along the axis.

The nacelle inner structure may extend axially along the axis between an upstream end and a downstream end. A first of the inner structure latches may be disposed at the upstream end of the nacelle inner structure. A second of the inner structure latches may be disposed at the downstream end of the nacelle inner structure.

A third of the inner structure latches may be disposed axially between the first of the inner structure latches and the second of the inner structure latches.

The third of the inner structure latches may be disposed axially closer to the second of the inner structure latches than the first of the inner structure latches.

The first inner structure section may extend circumferentially about the axis away from the stationary structure to a first end of the first inner structure section. The second inner structure section may extend circumferentially about the axis away from the stationary structure to a second end of the second inner structure section. The first end of the first inner structure section may be attached to the second end of the second inner structure section by the inner structure latches.

The first outer structure section may include a first sound attenuation structure facing the first inner structure section. The first sound attenuation structure may axially and circumferentially overlap one or more of the inner structure latches. The second outer structure section may include a second sound attenuation structure facing the second inner structure section. The second sound attenuation structure may axially and circumferentially overlap one or more of the inner structure latches.

The first sound attenuation structure may be disposed circumferentially next to the second sound attenuation structure.

The nacelle outer structure may also include a plurality of outer structure latches. The second outer structure section may be attached to the first outer structure section by the outer structure latches.

The first outer structure section may be configured with one or more first blocker door assemblies. Each of the one or more first blocker door assemblies may be configured to move from a stowed arrangement to a deployed arrangement to redirect air through a first thrust reverser passage that extends radially across the first outer structure section. In addition or alternatively, the second outer structure section may be configured with one or more second blocker door assemblies. Each of the one or more second blocker door assemblies may be configured to move from a stowed arrangement to a deployed arrangement to redirect air through a second thrust reverser passage that extends radially across the second outer structure section.

One of the one or more first blocker door assemblies may include a first blocker door and a first actuation linkage. The first blocker door may be pivotally coupled to a first translating component of the first outer structure section. The first actuation linkage may extend radially between and may be pivotally coupled to the first blocker door and the first inner structure section. In addition or alternatively, one of the one or more second blocker door assemblies may include a second blocker door and a second actuation linkage. The second blocker door may be pivotally coupled to a second translating component of the second outer structure section. The second actuation linkage may extend radially between and may be pivotally coupled to the second blocker door and the second inner structure section.

The first translating component may be configured as or otherwise include a first translating sleeve section. In addition or alternatively, the second translating component may be configured as or otherwise include a second translating sleeve section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
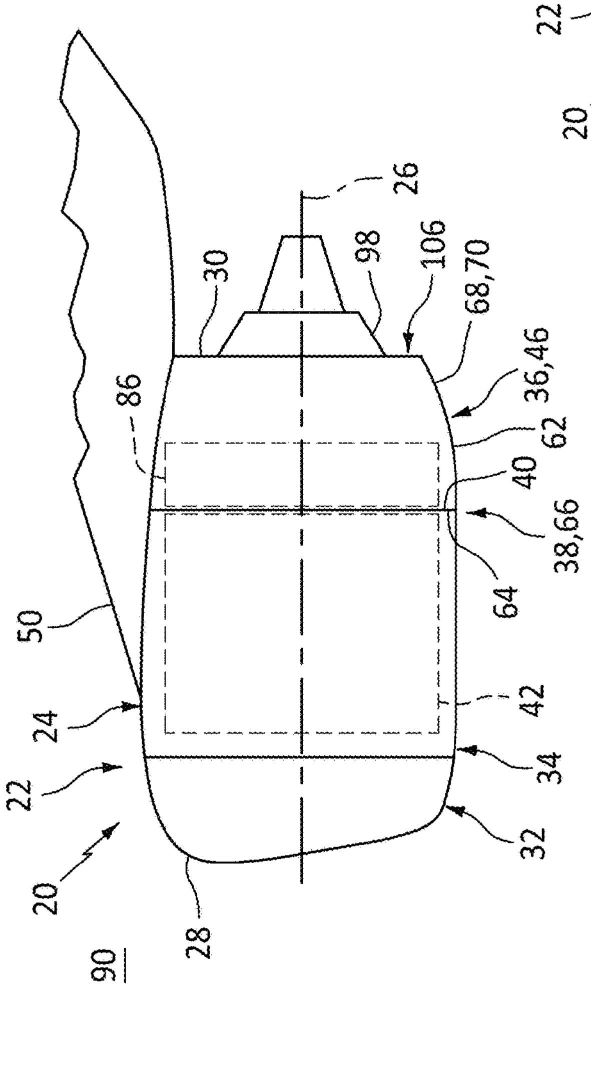
FIG. 1 is a schematic illustration of an aircraft propulsion system with a thrust reverser in a stowed position.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The aircraft propulsion system 20 includes a gas turbine engine and a nacelle 22.

The gas turbine engine is configured to power operation of the aircraft propulsion system 20. The gas turbine engine is also configured to produce thrust to propel the aircraft during flight. For ease of description, the gas turbine engine is generally described below as a turbofan engine such as a high-bypass turbofan engine. The present disclosure, however, is not limited to such an exemplary gas turbine engine. Moreover, while the aircraft propulsion system 20 is described as including the gas turbine engine to power operation and produce thrust, it is contemplated the gas turbine engine may be replaced by (or augmented with) one or more propulsor rotors (e.g., fan rotors and/or other air movers) driven by a hybrid-electric power unit or a fully electric power unit.

Figure 2:
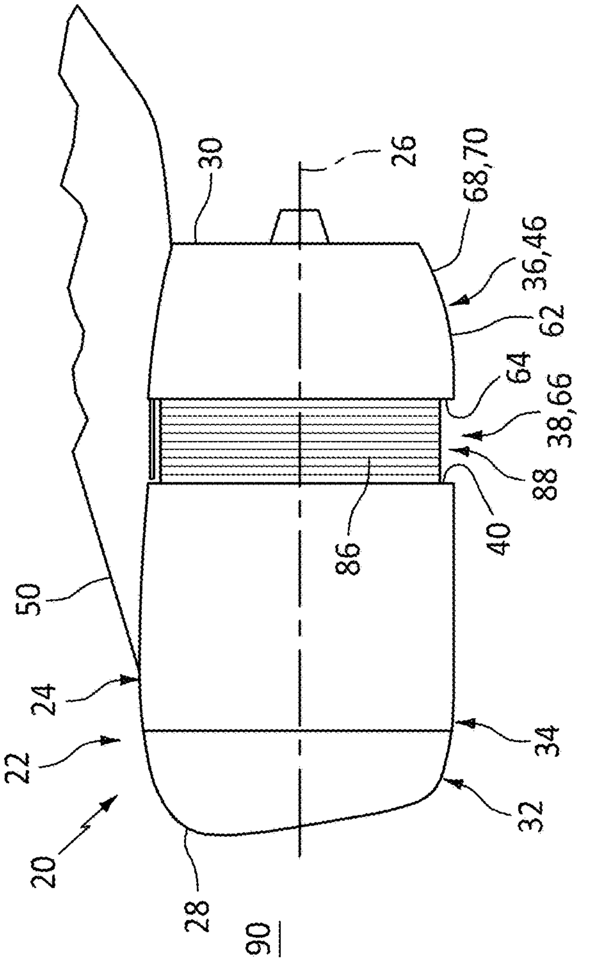
FIG. 2 is a schematic illustration of the aircraft propulsion system with the thrust reverser in a deployed position.

The nacelle 22 is configured to house and provide an aerodynamic cover for the gas turbine engine. An outer structure 24 of the nacelle 22 (e.g., an outer fixed structure (OFS)) extends along a centerline axis 26 from a forward end 28 of the nacelle 22 and its outer structure 24 to an aft end 30 of the nacelle outer structure 24. The nacelle outer structure 24 of FIG. 1 includes an inlet structure 32, one or more fan cowls 34 (one such fan cowl visible in FIG. 1) and an aft structure 36, which aft structure 36 is configured as part of or otherwise includes a thrust reverser 38 (see also FIG. 2).

The inlet structure 32 is disposed at the nacelle forward end 28. The inlet structure 32 is configured to direct a stream of air through an inlet opening at the nacelle forward end 28 and into a fan section of the gas turbine engine.

The fan cowls 34 are disposed axially between the inlet structure 32 and the aft structure 36. Each fan cowl 34 of FIG. 1, for example, is disposed at (e.g., on, adjacent or proximate) an aft end 40 of a stationary portion of the nacelle 22, and extends axially forward to the inlet structure 32. Each fan cowl 34 is generally axially aligned with the fan section of the gas turbine engine. The fan cowls 34 are configured to provide an aerodynamic covering over a fan case 42 for the fan section. Briefly, this fan case 42 circumscribes a fan rotor in the fan section and may partially form a forward outer peripheral boundary of a bypass flowpath 44 (see FIG. 6) of the aircraft propulsion system 20.

The term "stationary portion" is used above to describe a portion of the nacelle 22 that is stationary during aircraft propulsion system operation (e.g., during takeoff, aircraft flight and landing). However, the stationary portion may be otherwise movable for aircraft propulsion system inspection/maintenance; e.g., when the aircraft propulsion system 20 is non-operational. Each of the fan cowls 34, for example, may be configured to provide access to components of the gas turbine engine such as the fan case 42 and/or peripheral equipment configured therewith for inspection, maintenance and/or otherwise. In particular, each fan cowl 34 may be pivotally mounted with the aircraft propulsion system 20 by, for example, a pivoting hinge system. Alternatively, the fan cowls 34 and the inlet structure 32 may be configured into a single axially translatable body for example. The present disclosure, of course, is not limited to the foregoing fan cowl configurations and/or access schemes.

Figure 3:
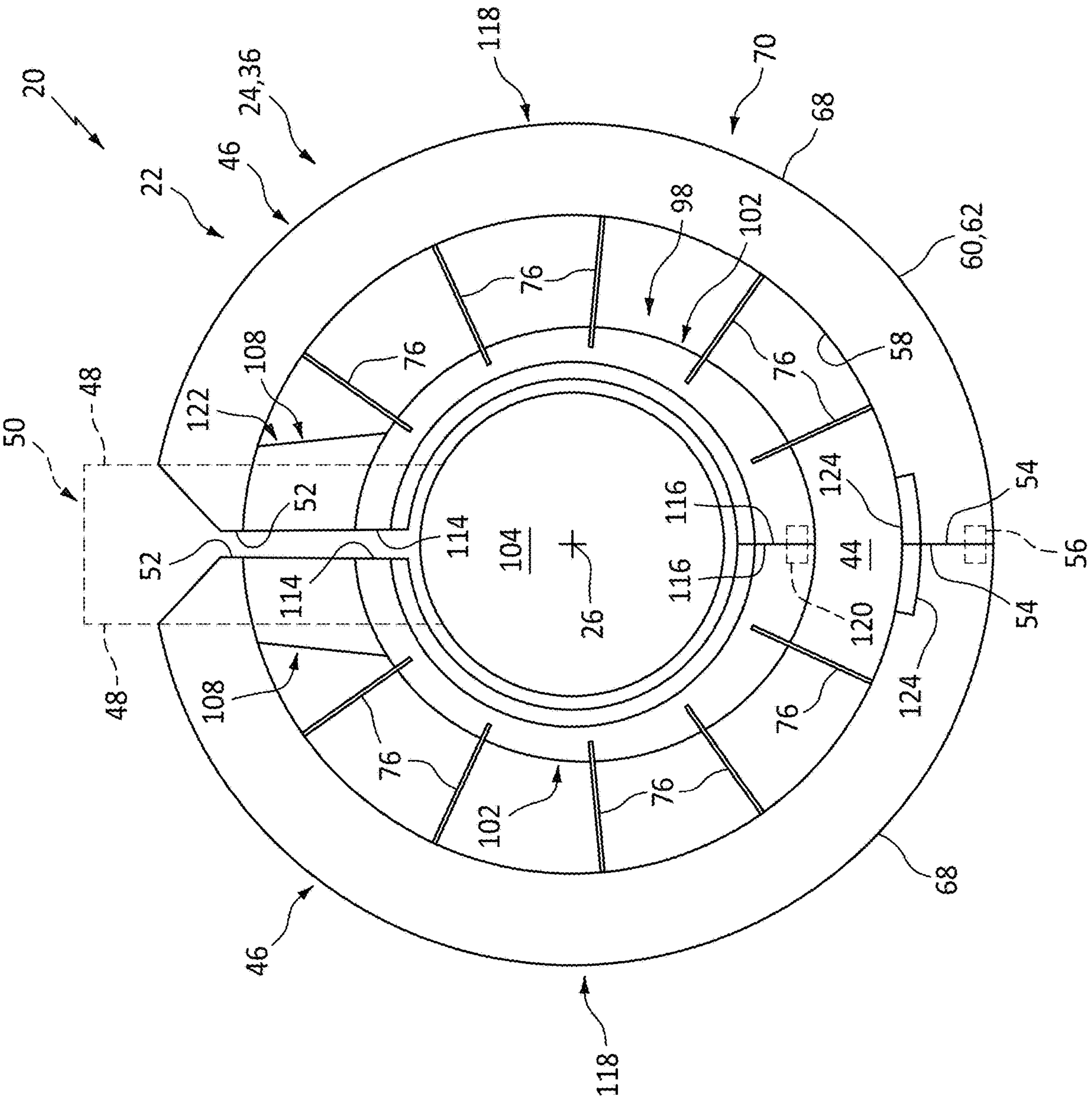
FIG. 3 is a schematic end view illustration of the aircraft propulsion system with the thrust reverser in the stowed position.

Referring to FIG. 3, the aft structure 36 includes a set of outer structure sections 46. These outer structure sections 46 are arranged on opposing sides of the aircraft propulsion system 20. More particularly, the outer structure sections 46 are arranged to opposing sides 48 of a stationary structure 50 such as a pylon structure for mounting the aircraft propulsion system 20 to an airframe of the aircraft.

Figure 4:
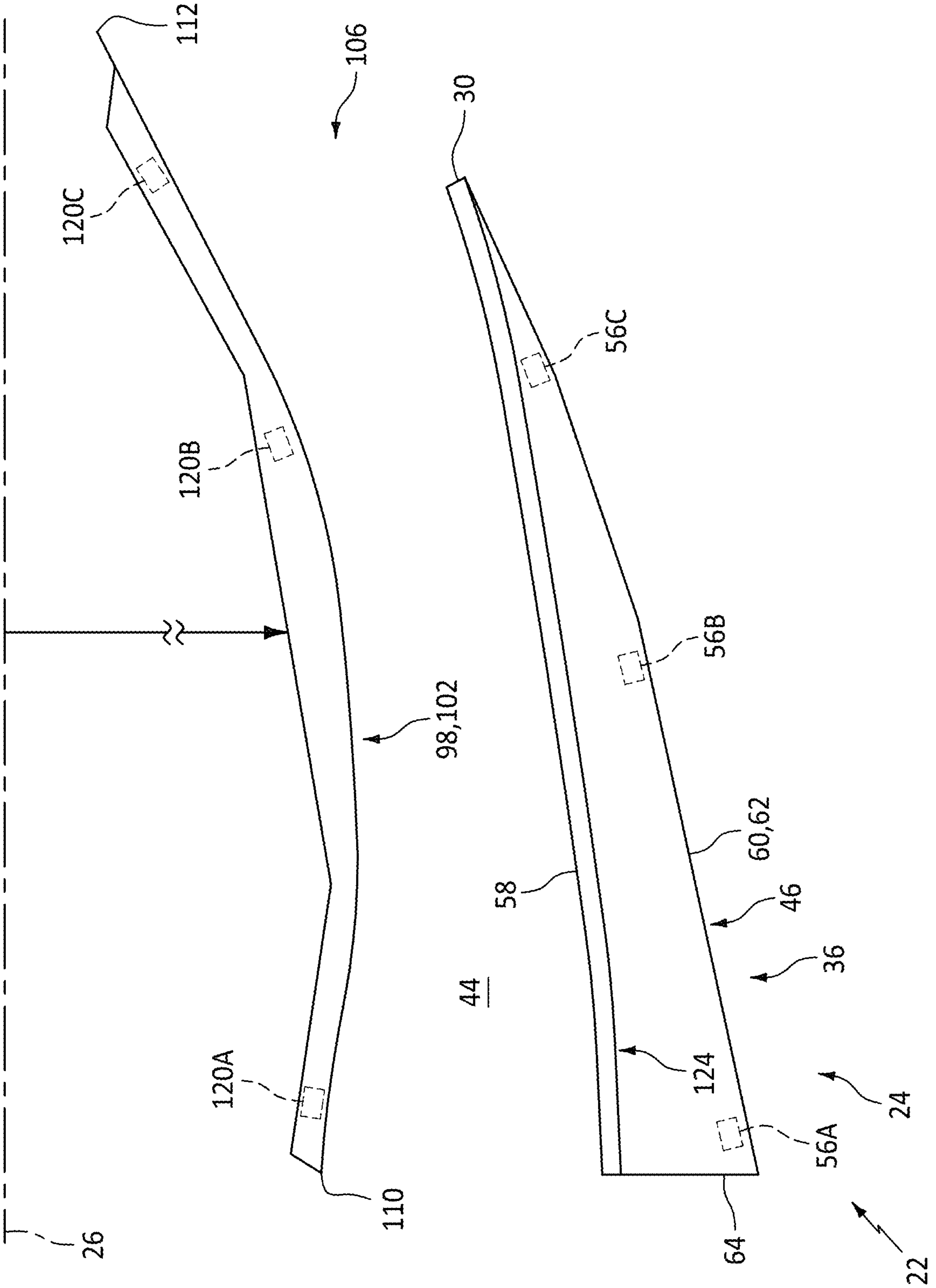
FIG. 4 is a partial schematic sectional illustration of the aircraft propulsion system.
Figure 5:
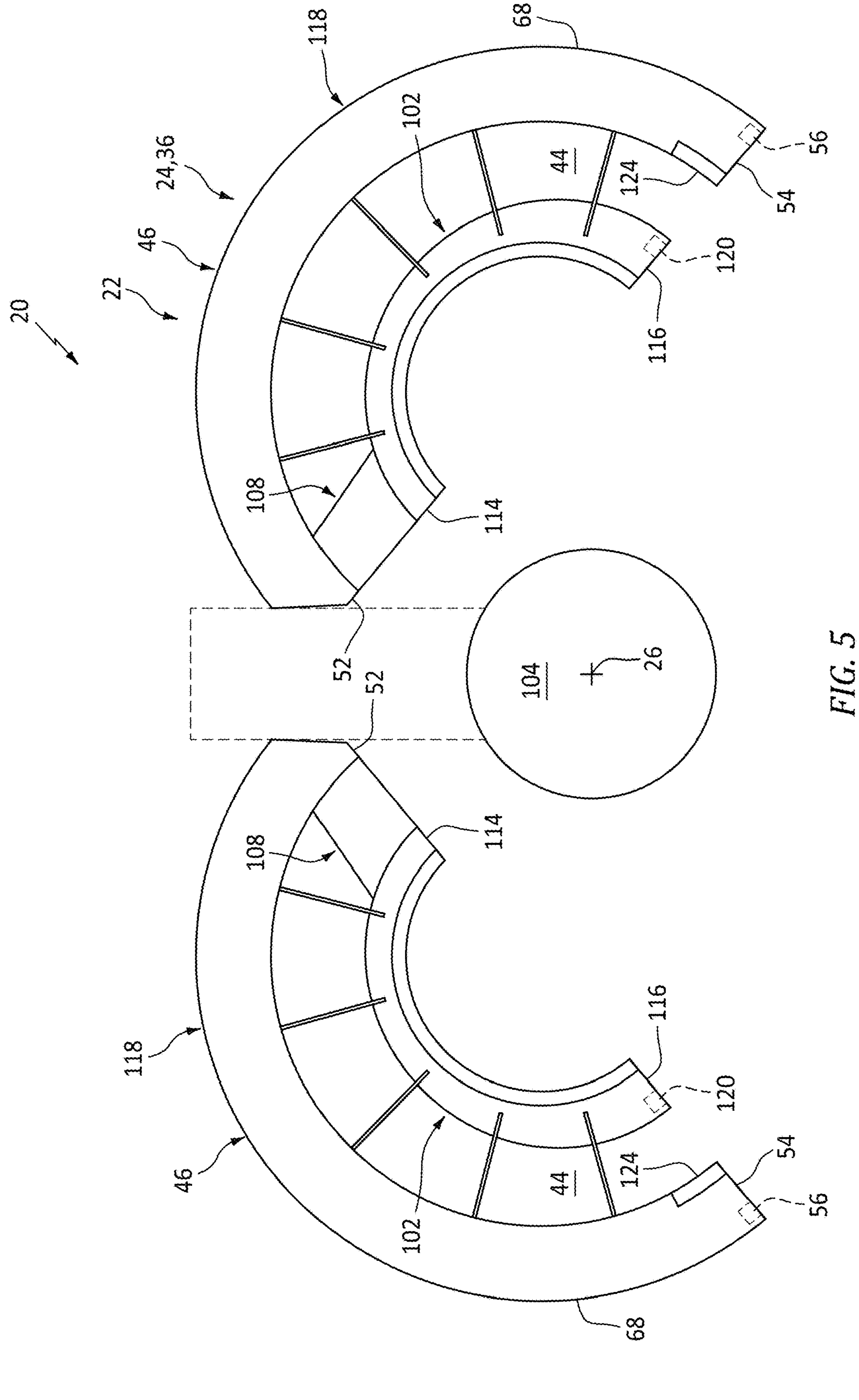
FIG. 5 is a schematic end view illustration of the aircraft propulsion system with its pivotable structures in open positions.

Each of the outer structure sections 46 extends circumferentially about the axis 26 from a circumferential first end 52 (e.g., a top end) of the respective outer structure section 46 to a circumferential second end 54 (e.g., a bottom end) of the respective outer structure section 46. At the outer structure section first end 52, each outer structure section 46 may be pivotally and/or otherwise moveably coupled to the stationary structure 50. At the outer structure section second ends 54, the outer structure sections 46 are removably attached to one another by one or more outer structure latches 56A-C (generally referred to as "56"). Referring to FIG. 4, these outer structure latches 56 may be arranged at discrete locations axially along the aft structure 36 and its outer structure sections 46. Referring again to FIG. 3, with such an arrangement, the outer structure sections 46 may collectively form a substantially annular body when the outer structure sections 46 are disposed in closed positions and attached together by the outer structure latches 56. Here, the annular outer structure body may extend circumferentially about the axis 26 at least, for example, three-hundred and thirty degrees (330°) or three-hundred and forty degrees (340°) between and to the opposing sides 48 of the stationary structure 50. However, when the outer structure latches 56 are unlatched to decouple the outer structure sections 46, each of the outer structure sections 46 may (e.g., independently) pivot and/or otherwise move from its closed position to an open position as shown, for example, in FIG. 5.

Each of the outer structure sections 46 of FIG. 3 extends radially from a radial inner side 58 of the respective outer structure section 46 to a radial outer side 60 of the respective outer structure section 46. Each outer structure section inner side 58 of FIG. 3 forms a radial outer peripheral boundary of a respective portion (e.g., downstream half) of the bypass flowpath 44. Each outer structure section outer side 60 of FIG. 3 forms an aerodynamic exterior surface 62 of the aircraft propulsion system 20 which is exposed to the ambient air outside of the aircraft propulsion system 20.

Referring to FIG. 1, each of the outer structure sections 46 extends axially along the axis 26 from a forward, upstream end 64 of the respective outer structure section 46 to the outer structure aft end 30. Similarly, each exterior surface 62 extends axially along the axis 26 from a forward, upstream end of the exterior surface 62 to the outer structure aft end 30. Here, the exterior surface upstream end may be the same as the outer structure section upstream end 64.

Figure 6:
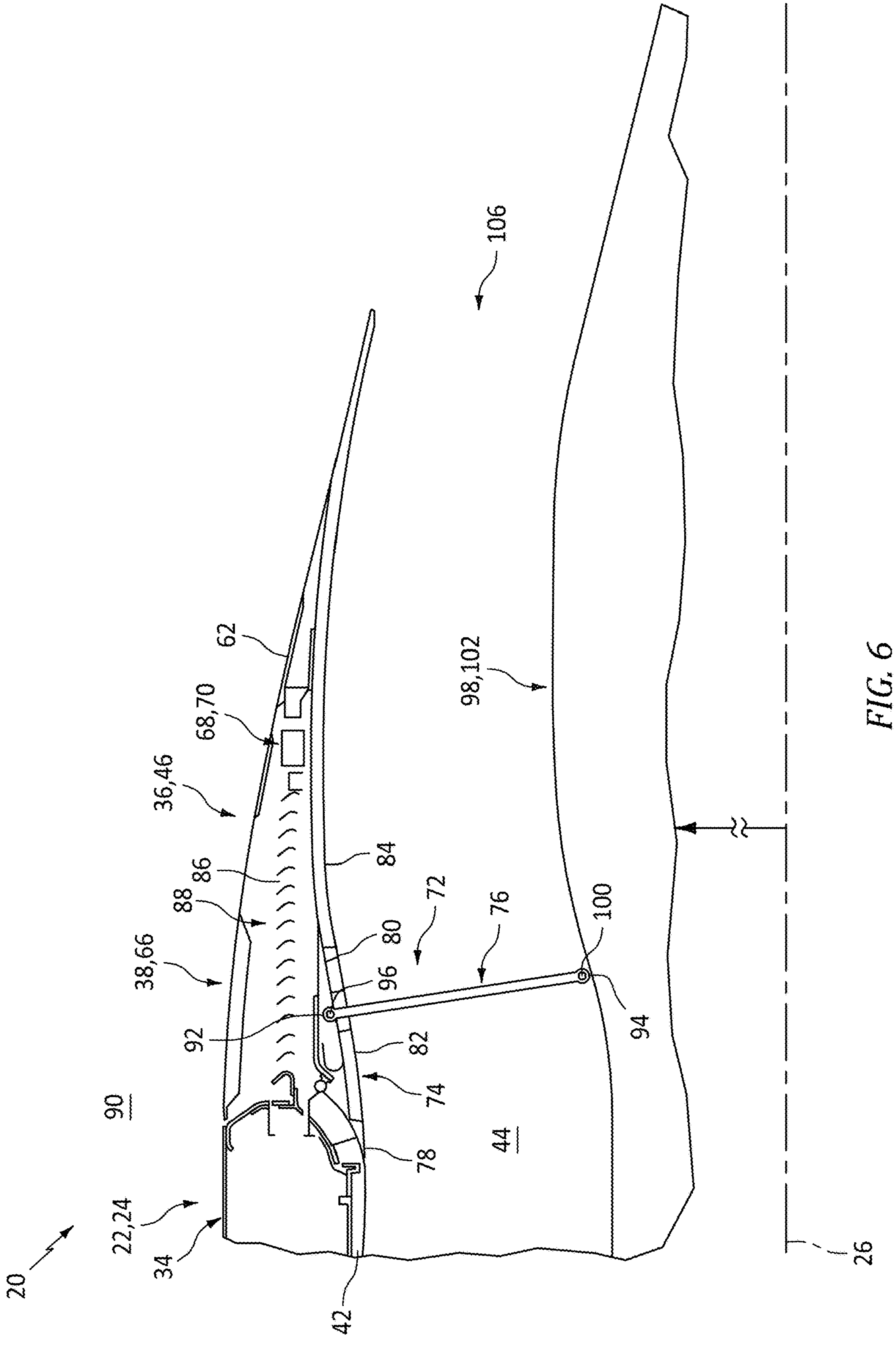
FIG. 6 is a partial schematic illustration of the aircraft propulsion system along a thrust reverser system in a stowed arrangement.
Figure 7:
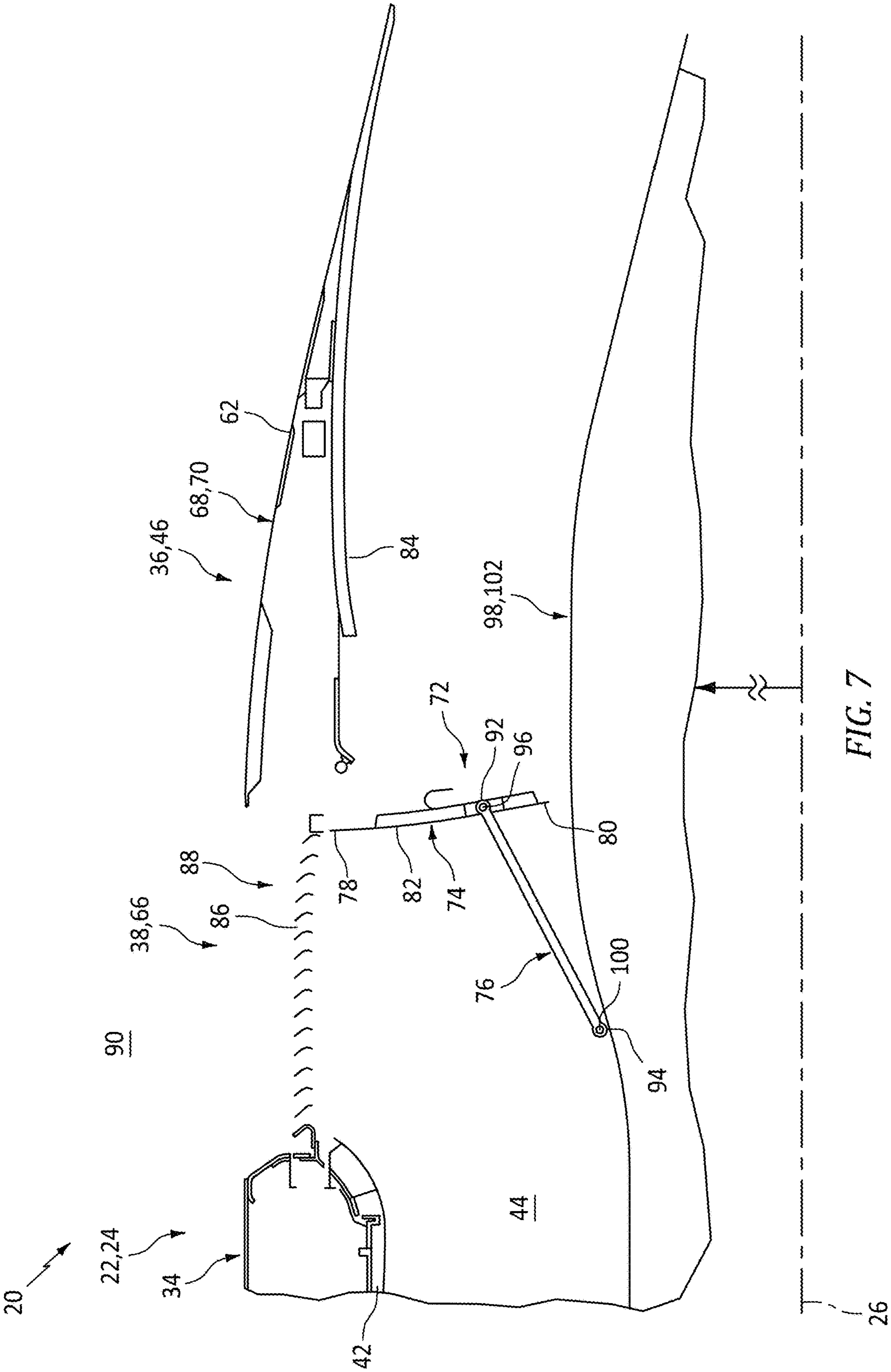
FIG. 7 is a partial schematic illustration of the aircraft propulsion system along the thrust reverser system in a deployed arrangement.
Figure 8:
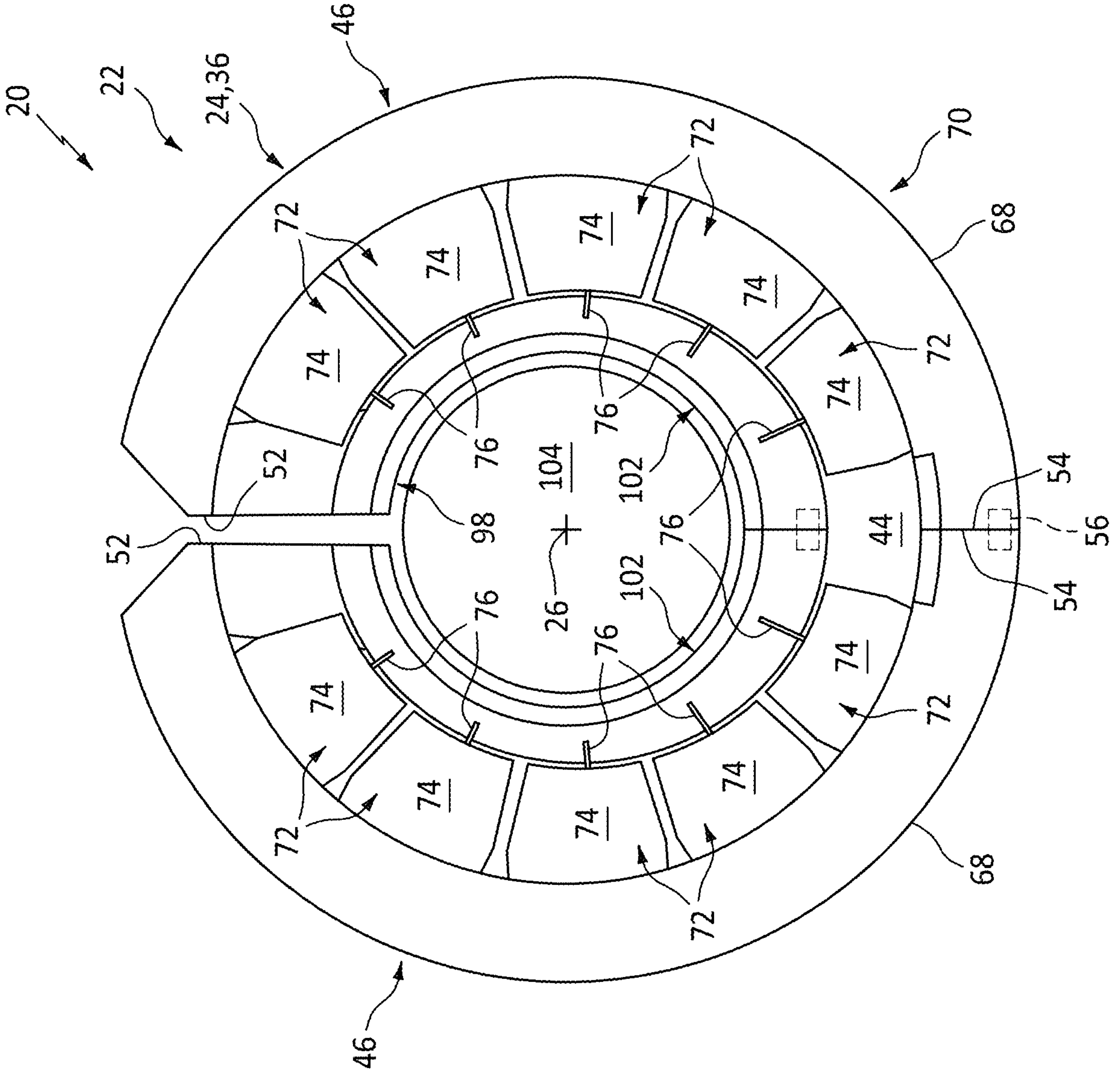
FIG. 8 is a schematic end view illustration of the aircraft propulsion system with the thrust reverser in the deployed position.

Referring to FIGS. 6 and 7, each outer structure section 46 is configured with a thrust reverser system 66. This thrust reverser system 66 includes a circumferential section 68 of a translating sleeve 70. Briefly, this sleeve section 68 includes/forms the respective exterior surface 62 and is configured to translate axially along the axis 26 between and to a stowed position (see FIG. 6) and a deployed position (see FIG. 7). The thrust reverser system 66 also includes one or more blocker door assemblies 72. Referring to FIG. 8, the blocker door assemblies 72 are arranged circumferentially about the axis 26 in an arcuate array circumferentially between the outer structure section first end 52 and the outer structure section second end 54.

Referring to FIGS. 6 and 7, the thrust reverser system 66 may be configured as an exposed drag link type thrust reverser system. Each blocker door assembly 72 of FIGS. 6 and 7, for example, includes a blocker door 74 and at least (or only) one door actuation linkage 76. Briefly, the door actuation linkage 76 is configured to actuate pivoting and/or other movement of the blocker door 74 between and to a stowed position (see FIG. 6) and a deployed position (see FIG. 7).

The blocker door 74 extends longitudinally between and to a first end 78 of the blocker door 74 and a second end 80 of the blocker door 74. This blocker door 74 is pivotally coupled to the sleeve section 68 (or another translating component) at or near the door first end 78. With this arrangement, the blocker door 74 is configured to pivot and/or otherwise move between its stowed position of FIG. 6 and its deployed position of FIG. 7.

When the blocker door 74 is in its stowed position of FIG. 6, the door first end 78 is a forward, upstream end of the blocker door 74 and the door second end 80 is an aft, downstream end of the blocker door 74. Here, the blocker door 74 is disposed outside of (e.g., next to and radially outboard of) the bypass flowpath 44. A side surface 82 of the blocker door 74 of FIG. 6, for example, forms a radial outer peripheral boundary of a respective portion of the bypass flowpath 44. This door side surface 82 may also be arranged flush with a radial inner surface 84 of the sleeve section 68.

When the blocker door 74 is in its deployed position of FIG. 7, the door first end 78 is a radial outer end of the blocker door 74 and the door second end 80 is a radial inner end of the blocker door 74. Here, the blocker door 74 is disposed in the bypass flowpath 44. The blocker door 74 of FIG. 7, for example, projects radially inward (e.g., towards the axis 26) into and substantially across the bypass flowpath 44. With this arrangement, the blocker door 74 and its side surface 82 are configured to block off a downstream portion of the bypass flowpath 44 and redirect air flowing in an upstream portion of the bypass flowpath 44 radially outward to flow through the outer structure section 46. Briefly, the downstream portion of the bypass flowpath 44 is a portion of the bypass flowpath 44 downstream of the deployed blocker door 74, and the upstream portion of the bypass flowpath 44 is a portion of the bypass flowpath 44 upstream of the deployed blocker door 74. The air redirected by the blocker door 74 flows radially outward (e.g., away from the axis 26) through a cascade structure 86 and a thrust reverser passage 88 into an environment 90 external to the aircraft propulsion system 20. The cascade structure 86 may further redirect the air flowing therethrough such that the air directed into the external environment 90 by the thrust reverser system 66 follows a trajectory with an axial forward component to provide reverse thrust.

The door actuation linkage 76 of FIGS. 6 and 7 is configured as a single drag link. The door actuation linkage 76 of FIGS. 6 and 7, for example, extends longitudinally from a first end 92 of the door actuation linkage 76 to a second end 94 of the door actuation linkage 76. The door actuation linkage 76 is pivotally and/or otherwise movably coupled to the blocker door 74 at the linkage first end 92, at an intermediate location between the door first end 78 and the door second end 80. Here, an outer pivot point 96 at the coupling between the door actuation linkage 76 and the blocker door 74 is a moveable pivot point in that the location of the outer pivot point 96 moves as the blocker door 74 moves between its stowed position of FIG. 6 and its deployed position of FIG. 7. The door actuation linkage 76 is pivotally and/or otherwise movably coupled to an inner structure 98 of the nacelle 22 (e.g., an inner fixed structure (IFS)) at the linkage second end 94. Here, an inner pivot point 100 at the coupling between the door actuation linkage 76 and the nacelle inner structure 98 is a stationary pivot point in that the location of the inner pivot point 100 does not move as the blocker door 74 moves between its stowed position of FIG. 6 and its deployed position of FIG. 7. With this arrangement, the door actuation linkage 76 extends radially across the bypass flowpath 44 when the blocker door 74 is in its stowed position. The door actuation linkage 76 further links the outer structure section 46 to a respective circumferential section 102 (e.g., an inner barrel section) of the nacelle inner structure 98.

During operation of the thrust reverser system 66, the door actuation linkage 76 operatively links the translating movement of the sleeve section 68 (or the other translating component) to the pivoting movement of the first blocker door 74. For example, as the sleeve section 68 translates axially aft from its stowed position of FIG. 6 to its deployed position of FIG. 7, the sleeve section 68 pulls the outer pivot point 96 axially aft. However, since the inner pivot point 100 is stationary, the door actuation linkage 76 pulls the blocker door 74 and its door second end 80 radially inward into the bypass flowpath 44. This motion may then be reversed when the sleeve section 68 translates axially forward from its deployed position of FIG. 7 to its stowed position of FIG. 6.

Referring to FIG. 3, the nacelle inner structure 98 and its members are configured to house a core 104 (e.g., a gas generator) of the gas turbine engine. The nacelle inner structure 98 and its members are configured to form at least a portion (or an entirety) of a radial inner peripheral boundary of the bypass flowpath 44. Referring to FIG. 1, the nacelle inner structure 98 also forms a bypass exhaust 106 from the bypass flowpath 44 with the aft structure 36 and its outer structure sections 46. Referring again to FIG. 3, the nacelle inner structure 98 includes the inner structure sections 102 and a plurality of (e.g., upper) bifurcation sections 108.

Referring to FIG. 4, each of the inner structure sections 102 extends axially along the axis 26 between opposing axial ends 110 and 112 of the respective inner structure section 102. Referring to FIG. 3, each inner structure section 102 extends circumferentially about the axis 26 from a circumferential first end 114 (e.g., a top end) of the respective inner structure section 102 to a circumferential second end 116 (e.g., a bottom end) of the respective inner structure section 102.

Each bifurcation section 108 is connected to (e.g., formed integral with or otherwise attached to) the respective inner structure section 102 at the inner structure section first end 114. Each bifurcation section 108 is connected to (e.g., formed integral with or otherwise attached to) the respective outer structure section 46 at the outer structure section first end 52. Each bifurcation section 108 of FIG. 3, for example, projects radially out from and structurally ties the respective inner structure section 102 to the respective outer structure section 46. With this arrangement, each respective set of the outer structure section 46, the inner structure section 102 and the bifurcation section 108 may collectively form a single pivotable structure 118; e.g., a thrust reverser half. More particularly, a respective set of the inner structure section 102 and the bifurcation section 108 is pivotally coupled to the stationary structure 50 through the respective outer structure section 46 and its coupling to the stationary structure 50. Each respective set of the outer structure section 46, the inner structure section 102 and the bifurcation section 108 is thereby operable to collectively move from its closed position of FIG. 3 to its open position of FIG. 5 as the single pivotable structure 118.

At the inner structure section second ends 116, the inner structure sections 102 are (e.g., removably) attached to one another by one or more inner structure latches 120A-C (generally referred to as "120"). Referring to FIG. 4, these inner structure latches 120 may be arranged at discrete locations axially along the nacelle inner structure 98 and its inner structure sections 102. Referring again to FIG. 3, with this arrangement, the inner structure sections 102 may collectively form a substantially annular body when the inner structure sections 102 are disposed in their closed positions and attached together by the inner structure latches 120. Here, the annular inner structure body may extend circumferentially about the axis 26 at least, for example, three-hundred and thirty degrees (330°) or three-hundred and forty degrees (340°) between and to opposing sides of a bifurcation 122/the bifurcation sections 108. However, when the inner structure latches 120 are unlatched to decouple the inner structure sections 102, each of the inner structure sections 102 may pivot and/or otherwise move with the respective pivotable structure 118 from the closed position of FIG. 3 to the open position of FIG. 5.

In some embodiments, referring to FIG. 4, the forward, upstream inner structure latch 120A may be disposed at or near the forward, upstream end 110 of the inner structure section 102. The aft, downstream inner structure latch 120C may be disposed at or near the aft, downstream end 112 of the inner structure section 102. The intermediate inner structure latch 120B is disposed at an intermediate position axially along the axis 26 between the upstream inner structure latch 120A and the downstream inner structure latch 120C. This intermediate inner structure latch 120B may be located axially along the axis 26 closer in proximity to the downstream inner structure latch 120C than to the upstream inner structure latch 120A.

In some embodiments, the aft structure 36 and its outer structure sections 46 may axially and circumferentially overlap one or more of the inner structure latches 120; e.g., 120A and 120B. However, it is contemplated the aft structure 36 and its outer structure sections 46 may not axially and circumferentially overlap at least one of the inner structure latches 120; e.g., 120C. The downstream inner structure latch 120C of FIG. 4, for example, is located axially of the outer structure aft end 30.

In some embodiments, each of the outer structure sections 46 may be configured with a sound attenuation structure 124. This sound attenuation structure 124 faces the nacelle inner structure 98 and extends longitudinally along the bypass flowpath 44. The sound attenuation structure 124 of FIG. 4, for example, extends axially along the respective outer structure section 46 from (or about) the forward, upstream end 64 of the respective outer structure section 46 to (or about) the aft, downstream end of the respective outer structure section 46; e.g., the outer structure aft end 30. With this arrangement, referring to FIGS. 3 and 4, the sound attenuation structure 124 may axially and circumferentially overlap one or more of the inner structure latches 120; e.g., 120A and 120B. Referring to FIG. 3, the sound attenuation structure 124 of one outer structure section 46 may be circumferentially next to and/or abut against the sound attenuation structure 124 of the other outer structure section 46. Here, the sound attenuation structures 124 are arranged diametrically opposite the bifurcation 122 and its bifurcation sections 108 as well as the stationary structure 50. Briefly, the sound attenuation structures 124 may be configured as or otherwise include one or more acoustic panels. Each acoustic panel may include a cellular core (e.g., a honeycomb core) sandwiched between a perforated face sheet and a non-perforated back sheet. Of course, various other types of sound attenuation structures are known in the art, and the present disclosure is not limited to any particular types thereof.

Referring to FIG. 3, the bypass flowpath 44 is formed by and extends radially uninterrupted between (a) the aft structure 36 and its members 46 and (b) the nacelle inner structure 98 and its members 102. The bypass flowpath 44 is also formed by and extends circumferentially uninterrupted about the axis 26 at least, for example, three-hundred and thirty degrees (330°) or three-hundred and forty degrees (340°) between the opposing sides of the bifurcation 122/the bifurcation sections 108.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:

a stationary structure;

a nacelle inner structure extending circumferentially about an axis and including a first inner structure section, a second inner structure section and a plurality of inner structure latches, the first inner structure section disposed to a first side of the stationary structure, the second inner structure section disposed to a second side of the stationary structure, and the second inner structure section attached to the first inner structure section by the plurality of inner structure latches;

a nacelle outer structure extending circumferentially about the nacelle inner structure and including a first outer structure section and a second outer structure section, the first outer structure section disposed to the first side of the stationary structure and pivotally coupled to the stationary structure, and the second outer structure section disposed to the second side of the stationary structure and pivotally coupled to the stationary structure;

a single bifurcation including a first bifurcation section and a second bifurcation section, the first bifurcation section projecting radially out from and structurally tying the first inner structure section to the first outer structure section, and the second bifurcation section projecting radially out from and structurally tying the second inner structure section to the second outer structure section, the first inner structure section and the first outer structure section collectively pivotable about the stationary structure as a first single pivotable structure, and the second inner structure section and the second outer structure section collectively pivotable about the stationary structure as a second single pivotable structure;

a first blocker door assembly;

a second blocker door assembly; and a bypass flowpath configured between the outer nacelle structure and the inner nacelle structure;

wherein the first blocker door assembly and the second blocker door assembly are disposed next to and radially outboard of the bypass flowpath in a stowed configuration;

wherein the first blocker door assembly and the second blocker door assembly are spaced apart about the bifurcation and about the plurality of inner structure latches thereby permitting, in a deployed configuration, at least a portion of the bypass flowpath that is circumferentially uninterrupted about the axis from the first bifurcation section to the second bifurcation section; and wherein the bypass flowpath is formed by and extends radially between the nacelle inner structure and the nacelle outer structure and circumferentially about the axis at least three-hundred and thirty degrees between the first bifurcation section and the second bifurcation section.

2. The assembly of claim 1, wherein the bifurcation is circumferentially aligned with the stationary structure about the axis.

3. The assembly of claim 1, wherein the first bifurcation section partially axially and radially covers the first side of the stationary structure; and the second bifurcation section partially axially and radially covers the second side of the stationary structure.

4. The assembly of claim 1, wherein the nacelle outer structure axially overlaps one or more of the plurality of inner structure latches along the axis.

5. The assembly of claim 1, wherein the nacelle outer structure does not axially overlap at least one of the plurality of inner structure latches along the axis.

6. The assembly of claim 1, wherein
the nacelle inner structure extends axially along the axis between an upstream end and a downstream end;
a first of the plurality of inner structure latches is disposed at the upstream end of the nacelle inner structure; and
a second of the plurality of inner structure latches is disposed at the downstream end of the nacelle inner structure.

7. The assembly of claim 6, wherein a third of the plurality of inner structure latches is disposed axially between the first of the plurality of inner structure latches and the second of the plurality of inner structure latches.

8. The assembly of claim 7, wherein the third of the plurality of inner structure latches is disposed axially closer to the second of the plurality of inner structure latches than the first of the plurality of inner structure latches.

9. The assembly of claim 1, wherein
the first inner structure section extends circumferentially about the axis away from the stationary structure to a first end of the first inner structure section;
the second inner structure section extends circumferentially about the axis away from the stationary structure to a second end of the second inner structure section; and
the first end of the first inner structure section is attached to the second end of the second inner structure section by the plurality of inner structure latches.

10. The assembly of claim 1, wherein
the first outer structure section includes a first sound attenuation structure facing the first inner structure section, and the first sound attenuation structure axially and circumferentially overlaps one or more of the plurality of inner structure latches; and
the second outer structure section includes a second sound attenuation structure facing the second inner structure section, and the second sound attenuation structure axially and circumferentially overlaps one or more of the plurality of inner structure latches.

11. The assembly of claim 10, wherein the first sound attenuation structure is disposed circumferentially next to the second sound attenuation structure.

12. The assembly of claim 1, wherein
the nacelle outer structure further includes a plurality of outer structure latches; and
the second outer structure section is attached to the first outer structure section by the plurality of outer structure latches.

13. The assembly of claim 1, wherein at least one of
the first blocker door assembly is configured to move from a stowed arrangement to a deployed arrangement to redirect air through a first thrust reverser passage that extends radially across the first outer structure section; or
the second blocker door assembly is configured to move from the stowed arrangement to the deployed arrangement to redirect air through a second thrust reverser passage that extends radially across the second outer structure section.

14. The assembly of claim 13, wherein at least one of
the first blocker door assembly includes a first blocker door and a first actuation linkage, the first blocker door is pivotally coupled to a first translating component of the first outer structure section, and the first actuation linkage extends radially between and is pivotally coupled to the first blocker door and the first inner structure section; or
the second blocker door assembly includes a second blocker door and a second actuation linkage, the second blocker door is pivotally coupled to a second translating component of the second outer structure section, and the second actuation linkage extends radially between and is pivotally coupled to the second blocker door and the second inner structure section.

15. The assembly of claim 14, wherein at least one of
the first translating component comprises a first translating sleeve section; or
the second translating component comprises a second translating sleeve section.

16. An assembly for an aircraft propulsion system, comprising:
a stationary structure;
a first pivotable structure disposed to a first side of the stationary structure and pivotally coupled to the stationary structure, the first pivotable structure including a first outer structure section, a first inner structure section and a first bifurcation section extending radially between the first outer structure section and the first inner structure section, and the first inner structure section extending circumferentially about an axis to a first end of the first inner structure section;
a second pivotable structure disposed to a second side of the stationary structure and pivotally coupled to the stationary structure, the second pivotable structure including a second outer structure section, a second inner structure section and a second bifurcation section extending radially between the second outer structure section and the second inner structure section, the second inner structure section extending circumferentially about the axis to a second end of the second inner structure section, and the second end of the second inner structure section attached to the first end of the first inner structure section by one or more inner structure latches;
a first blocker door assembly;
a second blocker door assembly; and
a flowpath extending circumferentially uninterrupted about the axis at least three-hundred and thirty degrees from the first bifurcation section to the second bifurcation section;
wherein the first bifurcation section and the second bifurcation section form a single bifurcation;
wherein the first blocker door assembly and the second blocker door assembly are disposed next to and radially outboard of the flowpath in a stowed configuration;
wherein the first blocker door assembly and the second blocker door assembly are spaced apart about the bifurcation and about the one or more inner structure latches thereby permitting, in a deployed configuration, at least a portion of the flowpath that is circumferentially uninterrupted about the axis from the first bifurcation section to the second bifurcation section.

17. The assembly of claim 16, wherein at least one of
the first blocker door assembly is configured to move from a stowed arrangement to a deployed arrangement to redirect air from the flowpath radially outward to a first thrust reverser passage; or
the second blocker door assembly is configured to move from a stowed arrangement to a deployed arrangement to redirect air from the flowpath radially outward to a second thrust reverser passage.

18. The assembly of claim 16, wherein the first outer structure section extends circumferentially about the axis to a first end of the first outer structure section;

the second outer structure section extends circumferentially about the axis to a second end of the second outer structure section; and the second end of the second outer structure section is attached to the first end of the first outer structure section by one or more outer structure latches.

19. An assembly for an aircraft propulsion system, comprising:

a single bifurcation including a first bifurcation section and a second bifurcation section;

a nacelle inner structure including a first inner structure section, a second inner structure section and one or more inner structure latches, the first inner structure section fixed to the first bifurcation section, the first inner structure section projecting out from the first bifurcation section circumferentially about an axis to a first end of the first inner structure section, the second inner structure section fixed to the second bifurcation section, the second inner structure section projecting out from the second bifurcation section circumferentially about the axis to a second end of the second inner structure section, and the second end of the second inner structure section attached to the first end of the first inner structure section by the one or more inner structure latches;

a nacelle outer structure including a first outer structure section, a second outer structure section and one or more outer structure latches, the first outer structure section fixed to the first bifurcation section, the first outer structure section projecting out from the first bifurcation section circumferentially about the axis to a first end of the first outer structure section, the second outer structure section fixed to the second bifurcation section, the second outer structure section projecting out from the second bifurcation section circumferentially about the axis to a second end of the second outer structure section, and the second end of the second outer structure section attached to the first end of the first outer structure section by the one or more outer structure latches;

a first blocker door assembly;

a second blocker door assembly; and a flowpath extending circumferentially uninterrupted about the axis from the first bifurcation section to the second bifurcation section;

wherein the first blocker door assembly and the second blocker door assembly are disposed next to and radially outboard of the flowpath in a stowed configuration;

wherein the first blocker door assembly and the second blocker door assembly are spaced apart about the bifurcation and about the one or more outer structure latches thereby permitting, in a deployed configuration, at least a portion of the flowpath that is circumferentially uninterrupted about the axis from the first bifurcation section to the second bifurcation section; and wherein the first bifurcation section is integral with the first inner structure section and the first outer structure section, and the first inner structure section, the first outer structure section and the first bifurcation section are configured as a single pivotable structure collectively movable between a closed position and an open position; and wherein the flowpath extends circumferentially about the axis at least three-hundred and thirty degrees between the first bifurcation section and the second bifurcation section.

* * * * *